(12) United States Patent
Franke

(10) Patent No.: US 6,248,910 B1
(45) Date of Patent: Jun. 19, 2001

(54) PROCESS FOR EXTRACTING OIL FROM OIL-BEARING NATURALLY OCCURRING ORGANIC MATERIALS

(75) Inventor: Henry L. Franke, Baton Rouge, LA (US)

(73) Assignee: University Research & Marketing Inc., Baton Rouge, LA (US)

(*) Notice: Subject to any disclaimer, the term of this patent is extended or adjusted under 35 U.S.C. 154(b) by 0 days.

(21) Appl. No.: 09/039,369

(22) Filed: Mar. 16, 1998

Related U.S. Application Data

(60) Continuation-in-part of application No. 08/660,770, filed on Jun. 10, 1996, now Pat. No. 5,739,364, which is a division of application No. 08/256,258, filed on Jun. 30, 1994, now Pat. No. 5,525,746, which is a division of application No. PCT/US92/11394, filed on Dec. 31, 1992, which is a continuation-in-part of application No. 07/815,700, filed on Dec. 31, 1991, now Pat. No. 5,281,732.

(51) Int. Cl.$^7$ .................................................... C07C 1/00
(52) U.S. Cl. ................... 554/12; 554/9; 554/13; 554/16; 554/18; 554/20; 554/21
(58) Field of Search ................... 554/9, 12, 18, 554/20, 13, 15, 21

*Primary Examiner*—Deborah D. Carr
(74) *Attorney, Agent, or Firm*—Henry & Naylor

(57) ABSTRACT

A multi-stage extraction process for extracting oil from naturally occurring oil-bearing organic materials. The oil, which is extracted, is inherent in the organic material by nature and is extracted in two or more extraction stages with an effective solvent at effective temperatures and pressures. The oil-bearing organic material is subjected to a vacuum between each extraction stage.

20 Claims, 4 Drawing Sheets

Figure 4

TOCOPHEROL AND TOCOTRIENOL CONTENT OF "CSP" AND JAPANESE RICE BRAN OIL

| SAMPLE I.D. | PPM TOCOTRIENOLS | | | | PPM TOCOPHEROLS | | | | PPM TOTALS |
|---|---|---|---|---|---|---|---|---|---|
| | DELTA | BETA/GAMMA | ALFA | PPM TOTAL | DELTA | BETA/GAMMA | ALFA | PPM TOTAL | TOCOLS |
| "CSP" CRUDE RICE BRAN OIL | 116 | 2204 | 276 | 2596 | 24 | 380 | 320 | 724 | 3320 |
| JAPANESE CRUDE RICE BRAN OIL | 72 | 610 | ND | 683 | 81 | 278 | ND | 359 | 1041 |

GAMMA-ORYZANOL CONTENT OF "CSP" AND JAPANESE RICE BRAN OIL

| SAMPLE I.D. | CYCLOARTENYL FERULATE | 24 METHANE FERULATE | CAMPESTERYL FERULATE | SITOSTERYL FERULATE | STIGMASTERYL FERULATE | PPM TOTAL |
|---|---|---|---|---|---|---|
| "CSP" CRUDE RICE BRAN OIL | 4600 | 5112 | 2864 | 1924 | 256 | 14756 |
| JAPANESE CRUDE RICE BRAN OIL | 2592 | 2969 | 1742 | 1054 | 109 | 8466 |

PROCESS FOR EXTRACTING OIL FROM OIL-BEARING NATURALLY OCCURRING ORGANIC MATERIALS

CROSS REFERENCE TO RELATED APPLICATIONS

This is a continuation-in-part U.S. Ser. No. 08/660,770 filed Jun. 10, 1996 now U.S. Pat. No. 5,739,364; which is a Divisional of 08/256,258 filed Jun. 30, 1994 now U.S. Pat. No. 5,525,746; which is a Divisional of PCT/US92/11394, filed Dec. 31, 1992; which is a Continuation-in-Part of 07/815,700, filed Dec. 31, 1991 now U.S. Pat. No. 5,281,732.

FIELD OF THE INVENTION

The present invention relates to a multi-stage extraction process for extracting oil from naturally occurring oil-bearing organic materials. The oil, which is extracted, is inherent in the organic material by nature and is extracted in two or more extraction stages with an effective solvent at effective temperatures and pressures. The oil-bearing organic material is subjected to a vacuum between each extraction stage.

BACKGROUND OF THE INVENTION

In many instances the characteristics of a particular naturally occurring organic material, such as agricultural, animal and seafood based products can be altered by the removal of certain components soluble in organic solvents. Non-limiting examples of such components include: phospholipids, fish oils, plant oils, fats, fatty acids, alcohols, cholesterol, waxes, gums, stearoids, oil soluble proteins, flavonol, essential oils, natural dyes, and PCBs.

More particularly, oils derived from plant materials, such as oil-seeds, cereal brans, fruits, beans, and nuts, as well as fish oils, are the source of raw material for many important commercial products. For example, oils from plant materials are extensively used in cooking, in cosmetics, pharmaceuticals, as carriers for insecticides and fungicides, in lubricants, in drilling muds, and in myriad other useful products. Consequently, much work has been done over the years in developing improved processes for extracting oil from such materials.

One of the most widely used processes for removing oil from oil-bearing naturally occurring organic materials is solvent extraction. In solvent extraction, the oil-bearing material is treated with a suitable solvent, usually the lower carbon alkanes, at elevated temperatures and pressures, to extract the oil from the oil-bearing material. The resulting solvent/oil mixture is then fractionated to separate the valuable oil from the solvent, which is recycled. Most solvent extraction processes in commercial use today employ hexane or carbon dioxide as the solvent. While hexane extraction is the most widely used today, there are also teachings in the art in which normally gaseous solvents are used at both supercritical and subcritical conditions.

One such teaching is found in U.S. Pat. No. 1,802,533 to Reid, wherein a normally gaseous solvent, preferably butane or isobutane, is liquefied by decreasing the temperature and/or increasing the pressure, then passing the solvent through a bed of the oil-bearing material in an extraction vessel. The solvent and extracted oil are then passed to a still where the solvent is separated from the oil. The extracted material must then be placed in another still where it is heated to remove solvent, which remained entrained in the extracted material. There is no suggestion of obtaining a substantially solvent-free, dry, extracted material without an additional treatment step after extraction.

Another extraction process is taught in U.S. Pat. No. 2,548,434 to Leaders wherein an oil-bearing material is introduced into the top of an extraction tower and passed counter-current to a liquefied normally gaseous solvent, such as propane, which is introduced at the bottom of the extraction tower. The tower is operated near critical conditions so that the solvent selectively rejects undesired color bodies, phosphatides, gums, etc. The resulting solvent/oil mixture can then be flashed to separate the solvent from the oil. In another embodiment, the solvent/oil mixture is first subjected to a liquid/liquid separation resulting in one fraction containing solvent and a less saturated fatty material, and another fraction containing solvent and a more saturated fatty material. The solvent is then flashed from both fractions. The extracted material remaining in the tower is drawn off and subjected to a vacuum flashing operation to remove entrained solvent.

Also, U.S. Pat. No. 4,331,695 to Zosel teaches a process for extracting fats and oils from oil-bearing animal and vegetable materials. The material is contacted with a solvent, such as propane, in the liquid phase and at a temperature below the critical temperature of the solvent of extract fat or oil from the material. The resulting solvent/oil mixture is treated to precipitate the extracted fat or oil from the solvent by heating the solvent to above the critical temperature of the solvent without taking up heat of vaporization. The extracted residue (shreds) is then treated to remove any entrained solvent, either by blowing it directly with steam, or by indirect heating followed by direct steaming.

In U.S. Pat. No. 5,041,245 to Benado, a continuous solvent extraction method utilizing propane is disclosed to remove oils from vegetable matter, particularly rice bran. According to this method, a sufficient amount of liquid sealing medium is first injected into the vegetable matter in a feeding zone to form a dough-like plastic mass, which is compacted and transported by a conveyor assembly to an extraction zone to form a bed. Propane is then introduced into the bed of the extraction zone being operated at 102°–122° F. and 125–250 psig to react with the bed of material. The micella of extracted oil and solvent resulting from this from the reaction of propane and bed material is then separated from the remaining solid residue of the bed material. The propane is then separated from the extracted oil by evaporation or volatilization methods. The preferred separation method is to first subject the micella near its critical pressure (600 psig for propane/rice bran oil mixture) and significantly elevated temperature (190°–200° F. for propane/rice bran oil mixture) which can also be near critical. This yields a high solvent light phase (98% solvent, 2% bran oil) and an oil-enriched heavy phase (60% solvent, 40% bran oil). The enriched heavy phase under reduced pressure is then delivered to a heater-evaporator and further treated to form a more oil-enriched heavy phase (10% solvent, 90% bran oil). This phase is then de-pressurized to about one atmosphere, and further treated in a second combined heater-evaporator stage to produce an oil stream having not more than 1–2% propane. Further, similar treatment of this oil stream could be accomplished to remove additional propane if desired.

Other references, which teach solvent extraction of oil-bearing materials, with normally gaseous solvents, include U.S. Pat. No. 2,682,551 to Miller and U.S. Pat. No. 2,560,935 to Dickinson. In each of these processes, the extracted material must be further processed to remove entrained solvent.

While prior art extraction methods, particularly hexane extraction, have met with various degrees of commercial success, there still remains a need in the art for an improved solvent extraction method which is more energy and cost efficient, which can effectively remove the solvent from the extracted compounds to meet government regulations, which is especially suitable for the processing of certain troublesome oil-bearing materials, as well as which allows greater selectivity of the compounds removed from the carbonaceous material and which results in the recovery of de-oiled products having superior nutrient and health characteristics.

When the oil-bearing material contains significant amounts of oil, prior art solvent extraction methods have been inefficient for removing most or all of the oil. Examples of such material would include jojoba, cocoa, flax seed, rapeseed, and canola, which are 30%–60% by weight oil. In these instances it has been necessary to first press the material to remove a majority of the oil before using solvent extraction methods to remove the remaining amounts of oil. Alternatively, the material could be first mechanically ground or pulverized to render the oil more accessible to reaction with the solvent. This latter method is difficult if the material has a high oil content.

In many of the instances where the material must first be pressed it is necessary to subject the material to high temperatures (200°–360° F.) to effectively remove the oil. In food material such high temperatures can result in deleterious effects to the desirable characteristics of the material, such as protein denaturing, vitamin destruction, and creation of carbonic acids which effect the aromatic odor of food material such as spices and herbs.

One particularly troublesome material is rice bran, one of the most plentiful and nutritious food sources known to man, but which is greatly underutilized. This is primarily because, immediately following the milling step, a lipolytic enzyme in the bran is activated which catalyzes the hydrolysis of the glyceryl esters of the free fatty acids (FFA) present in the lipids. This is measured by FFA increase, which is rapid at typical atmospheric storage conditions. These fatty acids leave the bran rancid in a matter of minutes after milling, and render it inedible to humans after several days of storage. Consequently, rice bran, as a source of oil and food, is underutilized, particularly in less developed countries. While food processors struggle to find ways to obtain a rice bran, and rice bran oil, free of these undesirable characteristics, more and more beneficial uses and nutritive values are being discovered for these products. For example, it has recently been reported that rice bran fiber is effective for lowering cholesterol in humans. As a result, a tremendous demand has been created for a process, which can stabilize the rice bran after milling, or a process, which will allow for the extraction of oil while at the same time stabilizing the oil and bran against further fatty acid formation.

Other problems are encountered with different food products. For example, in eggs it is desirable to remove the cholesterol from the yoke, yet have the eggs retain their natural proteins not denatured, texture, and taste when cooked. This has not been possible with the present known methods of solvent extraction.

Also, in many commercially available seasonings and food coating products one problem has been the inability to remove certain fats while retaining the flavoring of the products.

Still another problem has been to create seasoned or unseasoned food coatings that have dielectric characteristics, which increase the ability of the coating to adhere to the food product during handling and cooking. A further problem with food coatings occurs when the food product is microwaved. The moisture in the food product permeates the coating during the cooking process resulting in a soggy, unappetizing-looking crust.

The treatment of animal and seafood products by conventional solvent extraction processes to remove oils have not been commercially successful because of the dilatory effect on the taste, color or texture characteristics of the cooked animal products.

SUMMARY OF THE INVENTION

In accordance with the present invention there is provided a multi-stage extraction process for removing oil from oil-bearing organic materials, which process comprises:

(a) introducing the oil-bearing organic material into an extraction zone;

(b) introducing an effective solvent into said extraction zone;

(c) maintaining said solvent in contact with said organic material at an effective temperature and pressure so that the solvent is in liquid form, and for an effective amount of time to remove a fraction of the oil, thereby resulting in a partially extracted organic material;

(d) passing the resulting oil-laden solvent, in liquid form, from said extraction zone to a separation zone, wherein solvent is separated from the oil for recycle to the extraction zone;

(e) collecting the oil from the separation zone;

(f) reducing the pressure of said extraction zone to a point where at least a fraction of any remaining solvent will vaporize;

(g) introducing an effective solvent into said extraction zone;

(h) maintaining said solvent in contact with said partially extracted organic material at an effective temperature and pressure so that the solvent is in liquid form, and for an effective amount of time to remove a predetermined amount of oil;

(i) passing the resulting oil-laden solvent, in liquid form, from said extraction zone to a separation zone, wherein solvent is separated from the oil for recycle to the extraction zone;

(j) collecting the oil from the separation zone;

(k) reducing the pressure of said extraction zone to a point where at least a fraction of any remaining solvent will vaporize;

(l) repeating steps (g) through (k) until the desired level of oil extraction of said organic material is reached; and (m) removing the extracted organic material from the extraction zone.

In a preferred embodiment of the present invention the oil-laden solvent is passed from one or more extraction stages by heating the extraction zone thereby increasing the pressure in said extraction zone to an effective degree to cause the oil-laden solvent to flow into the separation zone.

In another preferred embodiment of the present invention an inert gas is introduced into said extraction zone after the partially extracted material has been subjected to a vacuum in one or more extraction stages.

In other preferred embodiments of the present invention the oil-bearing organic material is an agricultural commodity selected from the group consisting of soybeans, cottonseed, linseed, flaxseed, rapeseed, rice bran, wheat bran, and corn meal.

In still other preferred embodiments of the present invention the oil-bearing organic material is an anima-based material.

In yet another preferred embodiment of the present invention, the normally gaseous solvent is selected from methane, ethane, propane, butane, isobutane, butylene, hexane, sulfur dioxide, carbon dioxide, $CHF_3$, $CClF_3$, $CFBr_3$, $CF_2=CH_2$, $CF_3—CF_2—CF_3$, $CF_4$, $CF_4$, $CH_3—CF_3$, $CHCl_2$, ammonia, nitrogen, nitrous oxide, dichlorodifluor methane, dimethylether, $C_1$–$C_4$ alkyl acetates, methyl fluoride, and halogenated hydrocarbons which are normally gaseous.

In still another preferred embodiment of the present invention, the extraction zone is evacuated and flushed with an inert gas prior to introduction of the food product.

In yet other preferred embodiments of the present invention, an inert gas is used to displace the solvent in the extraction zone as it is passed from the extraction zone to the separation zone.

In another preferred embodiment of the present invention, the extraction zone is subjected to conditions which will repeatedly stress and relax the oil and/or solvent molecules.

In still other preferred embodiments of the present invention, the oil-extracted organic material is subjected to microwaves in other to aid in the removal of residual amounts of solvent from the substantially de-oiled product.

BRIEF DESCRIPTION OF THE FIGURES

FIG. 4 is a tabular representation of the characteristics of a rice bran de-oiled in accordance with the process of this invention.

DETAILED DESCRIPTION OF THE INVENTION

Figure 1:
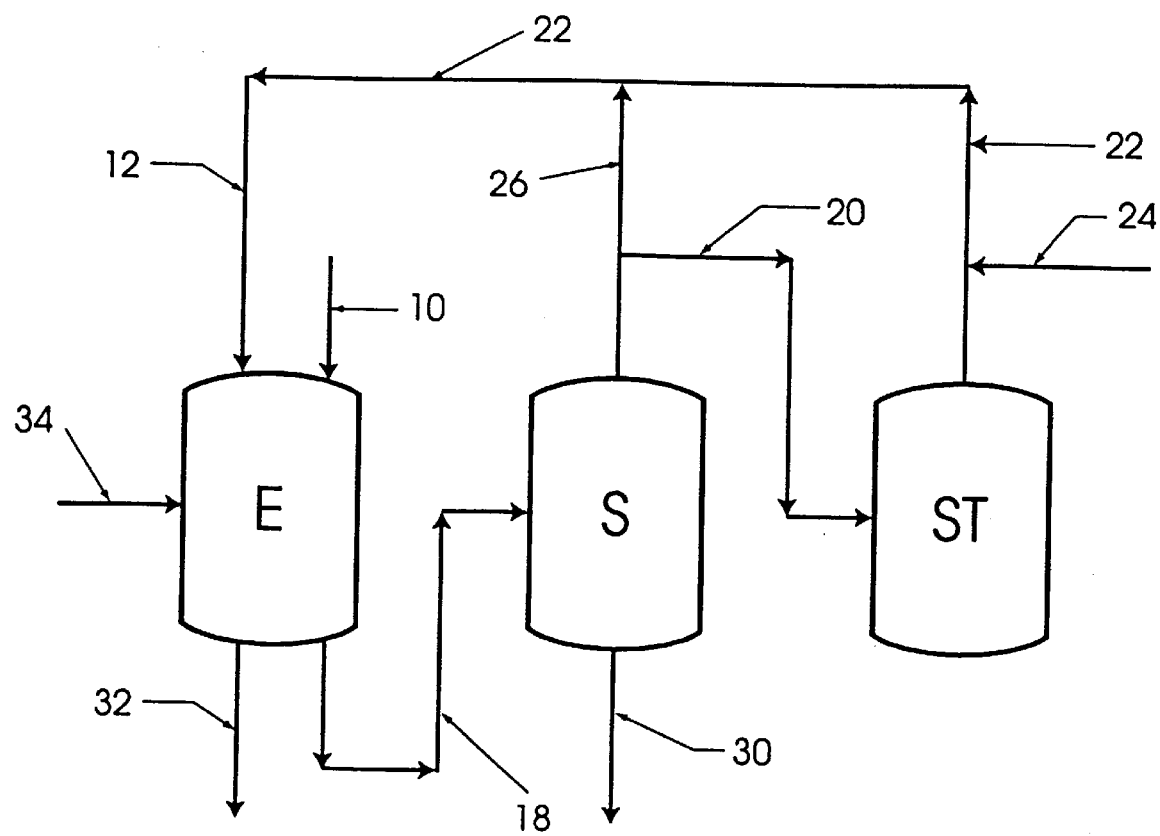
FIG. 1 is a simplified schematic drawing of a preferred solvent extraction process of the present invention.

Any oil-bearing naturally occurring organic material can be treated to selectively remove substances by the solvent extraction method of the present invention. Non-limiting examples of such materials include materials from both the plant kingdom and the animal kingdom. For example, preferred plant products include hemp; tobacco; vegetables, such as garlic; seeds, particularly soybeans, flax seed, rapeseed, mustard seed, salseed, sesame seed, cottonseed, linseed; nuts such as peanuts and pistachios; cereals such as rice bran, wheat bran, and corn meal. Non-limiting examples of organic materials from the animal kingdom include the vertebrates, such as fish, mammals, and birds; and the arthropods, preferably the crustaceans, such as lobsters, crabs, and shrimp. Included in the above are also crawfish and the shells thereof, animal parts, as well as small particle organic products such as food coatings. Non-limiting examples of the types of substances which can be removed from such materials include phospholipids, fish oils, plant oils, fats, fatty acids, alcohols, cholesterol, waxes, gums, stearoids, oil soluble proteins, flavonol, essential oils, natural dyes, and PCBs.

Solvents suitable for use in the present invention are effective solvents. That is, which are a liquid at extraction conditions, and in which the compound to be extracted is soluble under extraction conditions. The selection of the appropriate solvent (or combinations of solvents) can thus be made based on its (their) known solubility characteristics. If there is to be selective removal of substances, then the solubility of those substances must be considered in the selection of the solvent (or combination of solvents), as well as the operating conditions used in the process. In certain circumstances, such as when treating food products, other known characteristics of the solvent may need to be taken into account.

Without limiting the scope of this invention, the preferred embodiments are described as applied to the treatment of certain food products to remove oils, waxes, gums, fats, and/or cholesterol.

Preferred solvents are those which are normally gaseous at atmospheric conditions. That is, those which are a gas at about room temperature (about 70° F.) and atmospheric pressure. Non-limiting examples of preferred solvents include methane, ethane, propane, butane, isobutane, ethylene, propylene, butylene, sulfur dioxide, nitrous oxide, carbon dioxide, $CHF_3$, $CClF_3$, $CFBr_3$, $CF_2=CH_2$, $CF_3—CF_2—CF_3$, $CF_4$, $CF_4$, $CH_3—CF_3$, $CHCl_2$, ammonia, nitrogen, dichlorodifluor methane, dimethylether, methyl fluoride, and halogenated hydrocarbons which are normally gaseous as indicated. Preferred are propane, the butanes, and mixtures thereof, and, more preferred is propane.

The weight ratio of solvent to oil-bearing material will be from about 1:1 to 2:1, preferably from about 1.2:1 to 1.5:1. A co-solvent, such as a $C_2$ to $C_6$ alcohol, preferably ethanol, may be used. If a co-solvent is used it may be used in place of at least about 5 to 90 vol. %, preferably about 5 to 50 vol. %, and more preferably from about 5 to 25 vol. %, of the primary solvent.

Referring now to the Figures, oil-bearing material is introduced into extraction zone E via line 10. For fragile materials, the vessel can contain a removable top, which is removed, the material carefully placed in the vessel, and the top replaced. The extraction zone can be a single extraction vessel or it can be comprised of more vessels suitable for the volumes, temperatures, and pressures employed. For illustrative purposes, only one vessel is shown, but in actual practice it would be preferred to use two or more vessels. In this way, while a vessel has undergone extraction and is being unloaded, another vessel can be loaded with the oil-bearing material to start the extraction cycle. This would represent a continuous type of operation. Types of vessels, which may be used in the practice of the present invention, include fixed-bed, slurry-bed, moving-bed, as well as vessels in which the oil-bearing material is fed therethrough on or in a bucket, a belt with perforations, or with a screw. It is preferred that the vessel be one in which a fixed-bed of oil-bearing material can be loaded. It is preferred to evacuate the vessels of the extraction zone prior to the introduction of solvent, especially if the solvent is propane, which may form an explosive mixture with air. The evacuation can be performed in any suitable manner, such as, by use of a vacuum pump; venting the air from the extraction zone as it is displaced by the entering solvent; or by circulating $N_2$ or $CO_2$ through the vessel which comprises the extraction zone.

The oil-bearing material preferably sits on a filtering means, such as a screen, or membrane filter, or perforated tray (not shown), wherein the solvent passes there-through with the extracted oil. If the filter is a membrane filter the solvent can pass through without the oil. It is understood that an alternative process feature is one wherein the filtering means is situated between the extraction zone and the separation zone. The solvent is maintained in contact with the oil-bearing material for an effective period of time. That is, for a period of time which will result in the extraction of a predetermined amount of oil.

It is preferred that the extraction zone be flushed with inert gas prior to introduction of the solvent. It is also preferred that the inert gas be at elevated temperatures, for example at a temperature from about 80° to 400° F., but which does not heat the material beyond 140° F., preferably from about 55° to 120° F., during the heat transfer. This hot inert gas flush will act as evacuating the extraction zone of air as well as heating, or drying the oil-bearing material.

The oil-bearing material is preferably dry before being contacted with the solvent to mitigate any freezing which may occur during the process. While the hot inert gas can be used to dry the oil-bearing material, it may also be dried by any other appropriate means, such as by heating it by conventional means, including the use of microwaves. Furthermore, after flushing the extraction zone with inert gas, the inert gas can be used to pressurize the extraction zone so that when the normally gaseous solvent is introduced into the extraction zone it is immediately transformed to the liquid state to prevent freezing.

Returning to the Figures, the normally gaseous solvent is initially fed into the extraction zone via line 12, preferably in the vapor state, but will be converted to a liquid state as the solvent continues to be pumped into the extraction zone and the pressure increases. It is within the scope of this invention that the normally gaseous solvent be introduced into the extraction zone already in a liquid state. The inert gas can also be used to pressurize the extraction zone so that as the normally gaseous solvent enters the extraction zone, it is converted to its liquid form. Typically, the extraction temperature will be from about ambient temperature, up to, but not including, the temperature at which degradation, or denaturing, of the proteins and protecting vitamins of the oil-bearing material is initiated. This temperature will typically range from about ambient temperature to about 140° F., preferably from about 60° F. to 130° F., more preferably from about 70° F. to 120° F., most preferably from about 70° F. to about 110° F. For heat sensitive material such as dried egg yolks it is preferred that the temperature be 60°–90° F. It is within the scope of this invention to operate the extraction zone at a temperature and/or pressure which will selectively remove the oils, but leave any substances such as gums and waxes in the extracted oil-bearing material, or to selectively extract the phospholipid gums and waxes with the heavier oil fractions. Such a temperature will typically be less than about 80° F. at about atmospheric pressure. Of course, the temperature may vary somewhat at different pressures. In addition these temperatures may vary for any given oil-bearing material and solvent combination, and the precise conditions are within the skill of those in the art given the teaching herein. After the oil has been removed, it is then possible to similarly treat the remaining material, but at slightly elevated temperatures and/or pressure conditions to remove the waxes and gums. The above stated conditions are the preferred conditions when the oil-bearing material is rice bran and the solvent is propane. Since the de-oiled rice bran is a commercially important product it is preferred that the temperature not be so high that the proteins and vitamins of the rice bran are destroyed during the extraction process. The pressure maintained in the extraction zone will be a pressure, which is effective for maintaining the solvent as a liquid, and to drive the oil/solvent mixture rapidly through the vessel. While this pressure will be dependent on such things as the particular solvent and temperature employed, it will typically range from less than atmospheric pressures to about 200 psig, preferably from about −15" Hg to 200 psig, more preferably from about 100 psig to 140 psig, when a solvent such as propane is used.

The extraction zone can also be subjected to conditions that will repeatedly stress and relax the oil-bearing material and/or solvent molecules. This is believed to create a washing effect that enhances the ability of the solvent to extract the oil from the material. In addition, it is believed that such pressure pulsing aids in the separation of the heavier oil from the lighter solvent after the oil has been extracted from the material and while it is flowing toward the bottom of the reactor. Such stressing and relaxation can be caused by fluctuating the pressure of the extraction zone by at least about 0.25 psig, preferably by at least about ½ psig, more preferably by at least 1 psig, and most preferably by at least 5 psig. The pressure differential can be as great as will permit, under the temperature and pressure conditions of the material bed, the solvent passing through the exit port of the reactor to remain as a liquid.

This pressure differential can also be created by actuating and deactuating a piston or diaphragm in the pressure or solvent line. The stressing and relaxation conditions can also be caused by sonication; i.e., by subjecting the ingredients of the extraction zone to sonic energy.

In a particularly preferred method a second solvent or inert gas is introduced to the top surface of the extraction zone to increase the pressure and then briefly open the valve in the separation zone to cause the second solvent or inert gas to displace part of the propane/oil mixture through the bottom filter. In this manner it acts as a fluid piston. This action allows the bed to be comprised of much smaller particles than has generally heretofore been used in solvent extraction processes. This also allows the utilization of the forces of polarity in combination to extract different materials at the same time by using pressure from the second gas. By selecting a second solvent having a different polarity that solvent can be used to remove different substances, such as cholesterol from egg powders.

The period of time that the valve remains open would be sufficient to permit at least some of the extracted oil and solvent to flow through a filter at the bottom of the reaction vessel and into the separation zone. The extracted oil and solvent can at that time be separated if desired. After the valve is closed additional liquid propane or $N_2$ is then added to the bottom of the extraction zone to again raise the pressure and clear the filter in the extraction zone and purge the second solvent or inert gas. If another compound was extracted by the second solvent, then the mixture of the second solvent and the other compound will be forced through the top filter of the extraction zone and into an upper separation zone where the other compound can be recovered by known separation techniques.

In an alternate embodiment the bottom valve can be continuously open, and the top valve of the reactor through which the second gas enters the extraction bed can periodically be opened. This is achieved by setting the pressure at the top valve sufficiently higher than the desired pressure in the extraction bed, and by opening the top valve before the pressure at the bottom valve reaches a pressure too low to maintain the extraction bed pressure at the desired level.

The pulsing procedure may be repeated as many times as desired and with the proper construction of the reaction vessel utilizing many different solvents. The number of pulses, as well as the amount of the pressure differential, and the time between pulses, depends on the accessibility of the oil in the oil bearing material for contact by the solvent, as well as the polarity strengths of the substances involved; i.e., how strongly bonded the oil is to other substances, such as the proteins, in the product.

The solvent/oil mixture is passed from the extraction zone via line 18 to separation zone S under conditions, which will maintain the solvent as a liquid. It is important that the pressure be maintained in the extraction zone during removal of the solvent and oil not only to prevent unnecessary evaporation of solvent during removal which may result in freezing of the extracted material, but also to not complicate the removal of excess solvent in the material to less than that permitted by governmental regulations. This can be accomplished in several ways. For example, the extraction zone can be heated to cause an increase in pressure so that the solvent/oil mixture is forced out of the extraction zone and into the separation zone. After substantially all of the solvent/oil mixture is passed to the separation zone the extraction zone is sealed off from the separation zone. One reason to move the solvent/oil mixture to the separation zone in a liquid state is to prevent unnecessary evaporation of solvent resulting in freezing of the extracted material. Another way cause the solvent/oil mixture to pass from the extraction zone to the separation zone is to introduce a flush gas, preferably an inert gas such as nitrogen, into the extraction zone to replace the leaving solvent/oil mixture. By "inert gas" is meant a gas which will not have a deleterious effect on the food product or extracted oil which can be recycled for cooking a fresh batch of food product. It will preferably be gas in which the oil is substantially not soluble, either when the gas is in a gaseous form or if it should liquefy under process conditions. The flush gas will also preferably be one, which is dissimilar to the solvent used herein. For example, it will be a gas, which at a given temperature will liquefy at a higher pressure than the solvent. In other words, it is preferred that the inert gas be a gas and not a liquid at extraction conditions. The flush gas replaces the solvent/oil mixture in the extraction zone and maintains substantially the same pressure throughout the solvent/oil removal step. It is preferred that the flush gas be heated. That is, that it be at a temperature that will cause the extracted food product to be from about 90° F. to 140° F., preferably from about 100° F. to 120° F. This heated flush gas can enhance the recovery of any residual oil and solvent left in the de-oiled food product. It is also within the scope of this invention that solvent vapor be passed through the de-oiled food product either in place of the flush gas or following the passage of flush gas. This solvent vapor will act to remove at least a portion of the residual oil left in the de-oiled food product. Any remaining solvent can be removed from the final product by use of a vacuum or flushing with a gas such as nitrogen. It is also within the scope of the present invention to use microwaves to remove residual amounts of solvent from the de-oiled material.

It is also preferred that in designing the reactor vessel and in selecting the solvents to be used, the specific gravities of the substances to be removed and the specific gravity of the solvents be as different as possible. This has been found to be beneficial in the separation of the oil and solvent from each other, as well as the oil-bearing material, during the pulsing stages. For example, the large differential in the weight of propane and oil causes the propane to separate from the oil and move upward in a purified form to contact more oil still bound in the rice bran while the extracted oil rapidly moves toward the separation zone for removal. This reduces the amount of solvent needed to remove the oil and/or reduces the amount of separation of solvent from the extracted oil.

It is also within the scope of this invention that solvent vapor be passed through the deoiled material either in place of the inert gas or following the passage of inert gas. This solvent vapor will act to remove at least a portion of the residual oil left in the deoiled material.

The separation zone is run under conditions, which will enhance the separation of solvent from the oil. It is preferred that some heat be applied, preferably from a slightly heated solvent or inert gas, to enhance this separation. Other conditions for operating the separation zone to enhance solvent/oil separation include distillation, centrifugation, reduced pressures, and/or cryogenics. The separated solvent is then passed, via line 20, to storage zone ST where it can be recycled via line 22 to the extraction zone. Makeup solvent, if needed, can be added via line 24. At least a portion of the recovered solvent can be recycled directly to the extraction zone via line 26.

It is also within the scope of the present invention that the separation be conducted in more than one vessel. For example, the solvent/oil mixture (which may also include some of the second dissimilar gas) may first be subjected to a first separator vessel wherein a liquid/liquid (and gas if the second dissimilar gas is present) separation occurs. That is, the separation vessel is under enough pressure so that the solvent will not vaporize. The liquid solvent is separated from the oil phase. The liquid solvent fraction is then introduced into a second separation vessel wherein a liquid/ vapor separation occurs. That is, the solvent is vaporized and collected in a storage vessel and an residual oil fraction is separately collected. This second vessel will typically be smaller than the first and may include the use of a vacuum or other conventional means to aid in the vaporization of the solvent.

The gums and waxes, or certain oils, are present in the extracted oil fraction, they may be solidified out of the oil by cooling. The cooling can be provided by use of the vaporized solvent, which will still be cool owing to the vaporization step.

The substantially solvent-free oil is collected via line 30. The deoiled oil-bearing material can be collected from the extraction zone by any appropriate means. For purposes of simplification, the de-oiled material is shown in the Figure as being collected via line 32.

After the cooked food product has been extracted and the extraction zone isolated from the separation zone after passage of the solvent/oil mixture to the separation zone, the extraction zone is reduced in pressure to a point where at least a fraction of the solvent vaporizes. It is preferred that the extraction zone be reduced in pressure to a pressure less than about 10 psig, more preferably to a pressure about 0 psig, and most preferably to a pressure wherein the extraction zone is under vacuum. The temperature of the extraction zone can also be increased during this reduced pressure stage, or it can be increased first followed by reducing the pressure. Further, an inert gas can also be introduced into the extraction zone during this reduced pressure stage. At this point, the partially extracted food product is ready for another extraction stage. This can be accomplished in several ways. One way would be to first introduce an inert gas, as described above, followed by the introduction of the solvent to start another extraction, separation cycle. Another way would be to induce the solvent again, without first introducing an inert gas. This cycle can be repeated as many time as needed to reach a predetermined low oil level in the food product. It is preferred that the cooked food product be subjected to more than two extraction stages.

In those situations where the oil-bearing material is one which is unstable because of the production of fatty acids, such as rice bran, a stabilizing agent can be added to the extraction zone via line 34. Any appropriate means can be used to add the stabilizing agent. That is, it can be sprayed directly onto the oil-bearing material prior to the material being introduced into the extraction zone. It can also be introduced into the extraction zone either directly, (as shown in the figure) or in combination with the solvent. Rice bran, the preferred oil-bearing material, upon milling, activates lipolytic enzymes, which catalyze the production of free fatty acids. These free fatty acids cause the bran to become rancid. Non-limiting examples of stabilizers, which can be used to stabilize rice bran, include an inert gas such as nitrogen, food grade acids, mercaptans, and enzyme inhibitors. Preferred are food grade acids and alcohols, non-limiting examples of which include citric acid, ascorbic acid, lactic acid, gluconic acid, malic acid, and the like. More preferred are citric acid and ascorbic acid, with ascorbic acid being most preferred.

The rice bran which results from the preferred embodiment of the present invention is unique in the industry in commercial quantities. That is, not only are the fatty acids stabilized, but deleterious ingredients, which contribute to poor taste, are also absent. Furthermore, the rice bran of the present invention also contains more cyanocobalamin (vitamin B-12) then an identical bran, which has been extracted by use of a conventional hexane extraction process. Consequently, the rice bran produced in accordance with the present invention fills a long felt need in the art.

Figure 2:
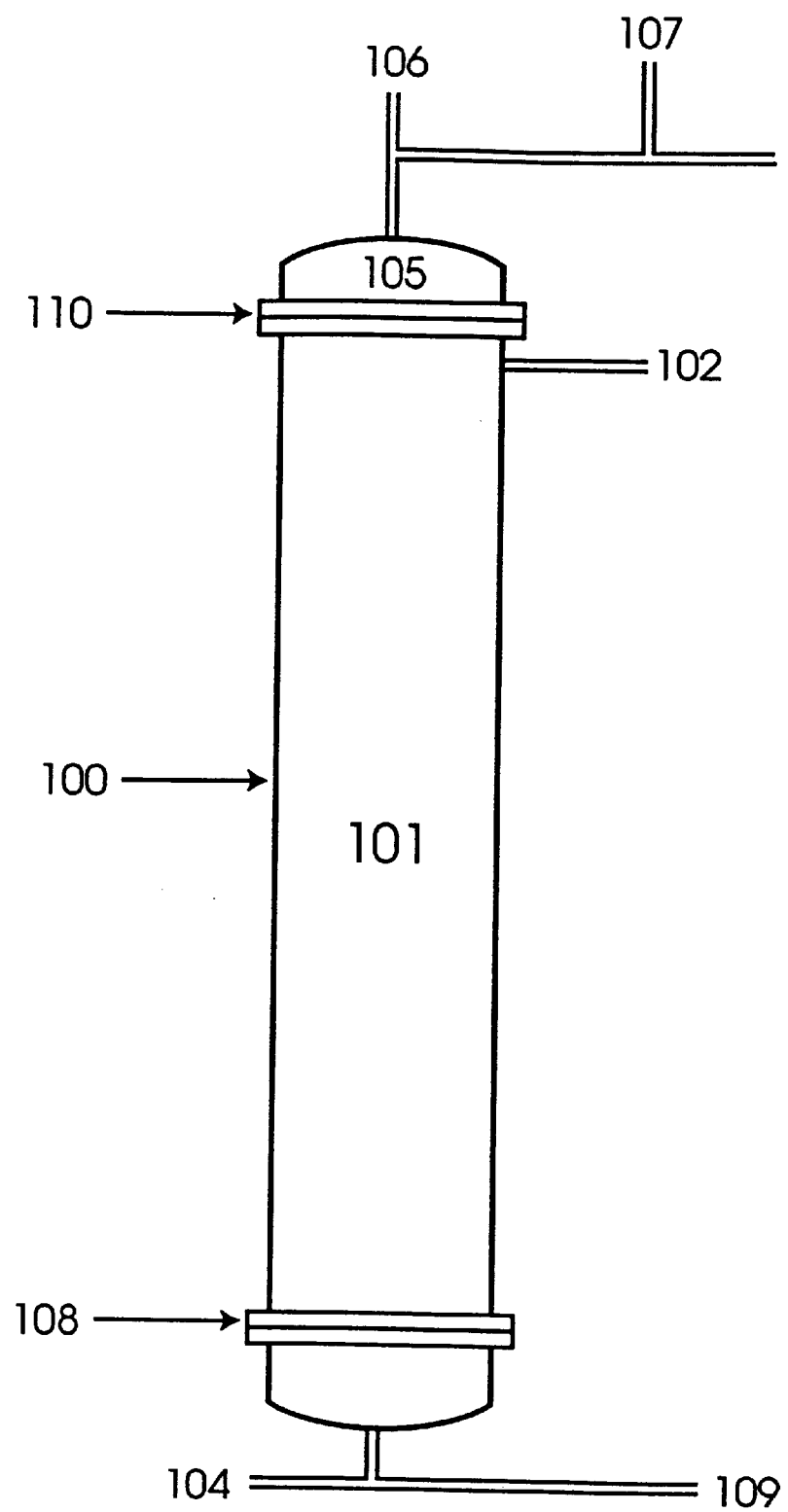
FIG. 2 is a schematic representation of the reaction vessel utilized in experiments described below.
Figure 3:
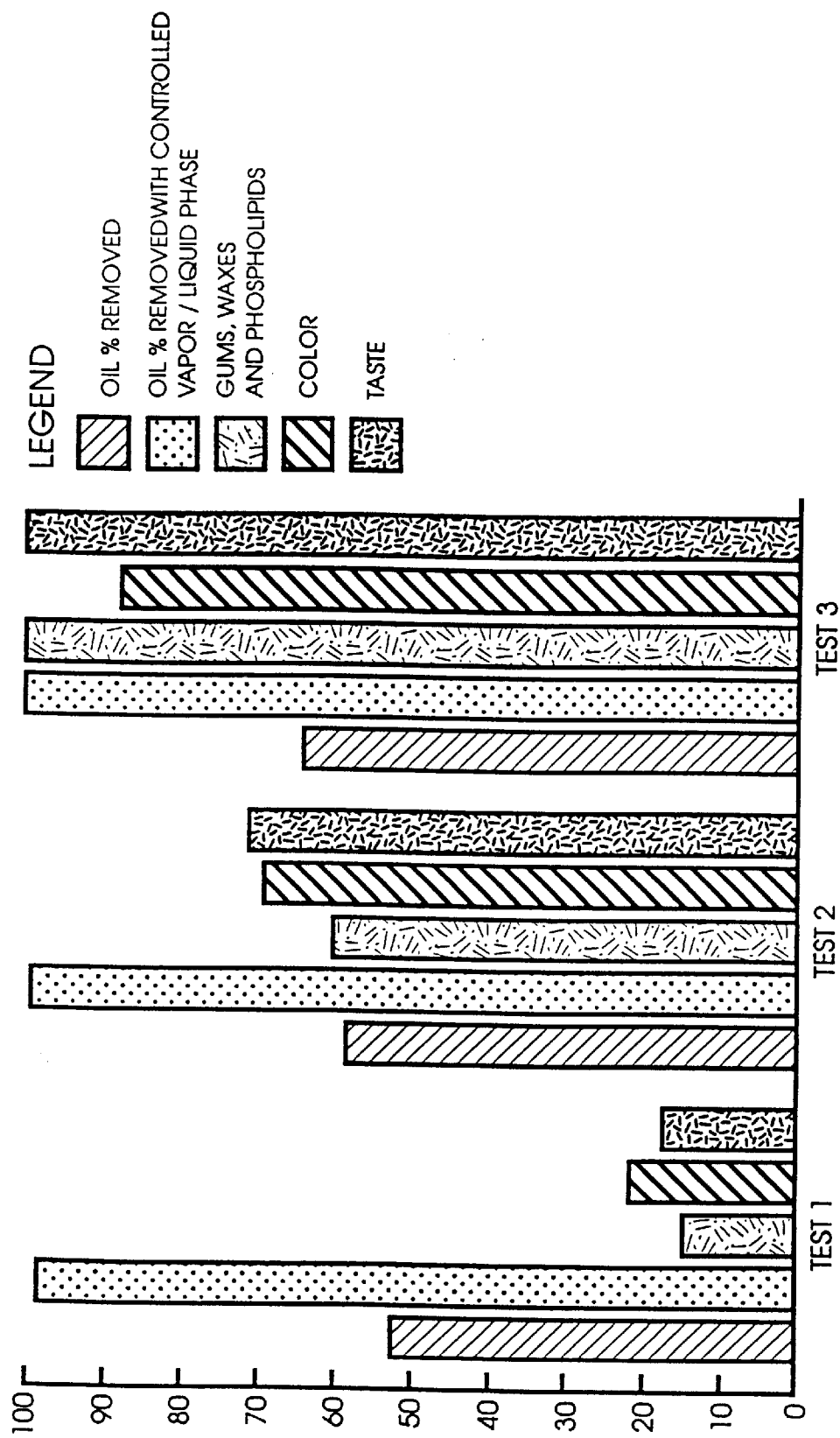
FIG. 3 is a graphical representation of the results of tests run utilizing the process of this invention in extracting oils from rice bran.

Utilizing the reactor vessel 100 schematically illustrated in FIG. 2 the experiments results of which are described in FIGS. 3–4 were conducted as follows. The rice bran or other material was introduced into the extraction zone 101 via line 102. Valve 103 operatively attached to line 102 was closed. Nitrogen was then introduced into the bottom of extraction zone 101 via line 104 in sufficient quantity to purge the air from extraction zone 101 into upper separation zone 105. The air was then purged from upper separation zone 105 through line 106 and to increase the pressure within extraction zone 101 to 127 psi.

Nitrogen was then reintroduced through line 107 in quantities sufficient to create a pressure differential between the top and bottom of extraction zone 101 of 1–50 psi. Valve 106 was then cracked open until the pressure differential had been dissipated at which time valve 106 was closed. The procedure was repeated for about ten minutes by re-introducing nitrogen through line 107.

Nitrogen was then used to purge extracted oil/propane mixture from the evaporation zone 101 and from reactor 100 through line 109. At all times during the procedure to this phase, the pressure and temperature was maintained at levels to prevent the propane from vaporizing while the oil/propane mixture was forced through the 400 mesh bottom filter 108.

Vacuum to 15" Hg is completed and nitrogen at 80° F. was then circulated through the evaporation zone 101 to remove all trace amounts of propane which remained in the de-oiled rice bran which was removed from reactor 100 through line 106.

Upper 200 mesh filter 110 is removed and the de-oiled rice bran was removed from reactor 100. The extracted $N_2$/oil/propane mixture removed from reactor 100 were separated by alternatively cooling and heating, and use of pressure in a separate vessel 200 by well known means.

The de-oiled rice bran or other material was then analyzed. The results are summarized in FIGS. 3 and 4 hereof.

What is claimed is:

1. A multi-stage extraction process for removing oil from oil-bearing organic materials, which process comprises:
    (a) introducing the oil-bearing organic material into an extraction zone;
    (b) introducing an effective solvent into said extraction zone;
    (c) maintaining said solvent in contact with said organic material at an effective temperature and pressure so that the solvent is in liquid form, and for an effective amount of time to remove a fraction of the oil, thereby resulting in a partially extracted organic material;
    (d) passing the resulting oil-laden solvent, in liquid form, from said extraction zone to a separation zone, wherein solvent is separated from the oil for recycle to the extraction zone;
    (e) collecting the oil from the separation zone;
    (f) reducing the pressure of said extraction zone to a point where at least a fraction of any remaining solvent will vaporize;
    (g) introducing an effective solvent into said extraction zone;
    (h) maintaining said solvent in contact with said partially extracted organic material at an effective temperature and pressure so that the solvent is in liquid form, and for an effective amount of time to remove a predetermined amount of oil;
    (i) passing the resulting oil-laden solvent, in liquid form, from said extraction zone to a separation zone, wherein solvent is separated from the oil for recycle to the extraction zone;
    (j) collecting the oil from the separation zone;
    (k) reducing the pressure of said extraction zone to a point where at least a fraction of any remaining solvent will vaporize;
    (l) repeating steps (g) through (k) until the desired level of oil extraction of said organic material is reached; and
    (m) removing the extracted organic material from the extraction zone.

2. The process of claim 1 wherein the oil-laden solvent is passed from one or more extraction stages by heating the extraction zone thereby causing a fraction of the solvent to vaporize and increase the pressure in said extraction zone to an effective degree to cause the oil-laden solvent to flow into the separation zone.

3. The process of claim 2 wherein an inert gas is introduced into said extraction after one or more extraction stages and after said one or more extraction zones have been subjected to a vacuum.

4. The process of claim 1 wherein the solvent is in a liquid phase in the extraction zone.

5. The process of claim 1 wherein the solvent is in the gaseous phase in the extraction zone.

6. The process of claim 1 wherein the solvent is selected from propane, butane, and mixtures thereof.

7. The process of claim 3 wherein the solvent is propane.

8. The process of claim 1 wherein the oil-bearing material is rice bran.

9. The process of claim 6 wherein an effective amount of stabilizer is added to the extraction zone with the solvent and oil-bearing material to stabilize the production of free fatty acids.

10. The process of claim 9 wherein the stabilizer is selected from food grade acids, alcohols, mercaptans, and enzyme inhibitors.

11. The process of claim 10 wherein the food grade acid is selected from citric acid and ascorbic acid.

12. The process of claim 1 wherein the temperature of the extraction zone does not exceed about 140° F.

13. The process of claim 1 wherein the extraction zone is maintained at a temperature from about 70° F. to about 110° F. at pressures ranging from pressures less than atmospheric pressure to about 200 psig.

14. The process of claim 1 wherein the oil-bearing material sits on a filtering screen which allows the passage of solvent and oil, but not the material itself.

15. The process of claim 14 wherein the filtering screen is situated between the extraction zone and the separation zone.

16. The process of claim 1 wherein the oil-bearing material is a material which produces free fatty acids at a substantial rate until the oil is extracted.

17. The process of claim 15 wherein an effective amount of stabilizer is added to the extraction zone with the solvent and oil-bearing material to stabilize the production of free fatty acids.

18. The process of claim 1 wherein the molecules of the mixture in the extraction zone are periodically stressed during extraction.

19. The process of claim 18 wherein the molecules are stressed by fluctuating the pressure by at least 1 psig.

20. The process of claim 19 wherein the molecules are stressed by sonication.

* * * * *